United States Patent Office 3,364,493
Patented Jan. 16, 1968

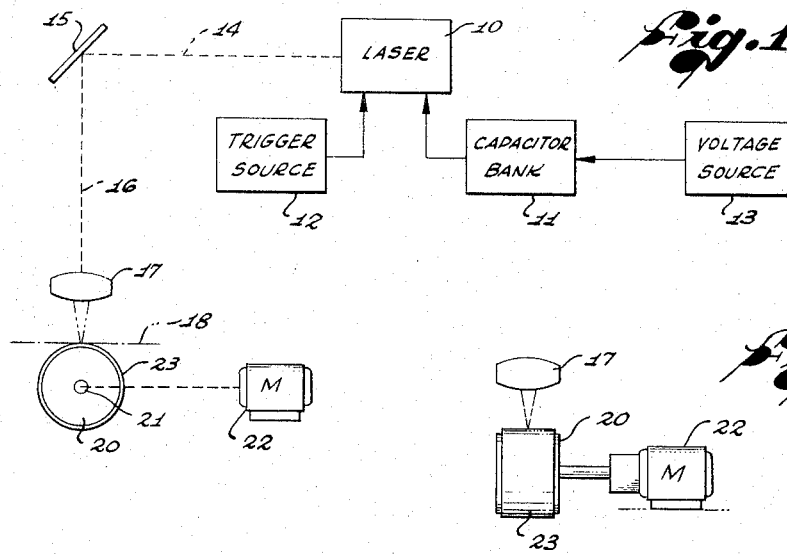

3,364,493
DEVICE AND METHOD FOR MEASUREMENT OF
LASER ENERGY DISTRIBUTION
Jon H. Myer, Newport Beach, Calif., assignor to Hughes Aircraft Company, Culver City, Calif., a corporation of Delaware
Filed Jan. 17, 1966, Ser. No. 521,058
6 Claims. (Cl. 346—1)

ABSTRACT OF THE DISCLOSURE

A device and method of determining the energy of a laser beam wherein a stack of colored sheets is exposed to a laser beam to be vaporized to an extent dependent upon the instantaneous energy of the beam, thereby creating a streak of different colors indicating the distribution of the beam energy in time and space.

This invention relates to laser beam devices, and more particularly to a unique method and means by which to record and permit visual inspection of the energy distribution of laser pulses.

In laser welding techniques, it is known that the surface of an element must be properly liquefied for welding, and that the material and thickness of the element determine the energy distribution of laser pulses needed for this purpose. For example, for two elements of different materials and the same thickness, one may require that most of the pulse power be applied in a tenth of a millisecond, whereas it may have to extend over a period ten times as long for the other element.

For different thicknesses and materials of various kinds, it is necessary to make a permanent record of this information once it has been obtained. When one desires to weld an element of the type for which the energy distribution has been classified, he must adjust the voltage and capacitor settings for the laser and check its performance.

In this latter connection, the pulse type laser is provided with a voltage source which is coupled to a capacitor bank for building up the desired charge voltage. Both are variable, so that peak pulse power (watts per square centimeter) and the time duration thereof can be varied.

The techniques heretofore known for checking laser performance involve the use of complex and costly equipment. Typically, a special oscilloscope is employed for displaying a visible trace of the pulse formed on a cathode ray tube which measures the voltage taken from the output of a photodetector placed in the path of the beam, or the output of a calorimeter which measures the heat created at the object plane of the laser. An alternate method of measuring the laser output power is to record with an oscilloscope the high power current surge coming from the capacitor bank and powering the laser pumping lamp. This surge is proportional to the laser output. The time duration of a laser pulse is so short that the waveform displayed cannot be assimilated by the observer. Accordingly, means for retaining this image such as image storing oscilloscopes or a photograph of the cathode ray screen at the instant of firing, are required for the study of this display.

Such a technique of course requires circuitry to synchronize the operation of the camera with that of the laser. Needless to say, all the equipment required is quite complex and expensive. Even so, the record obtained, being a trace that appears on a grid, or screen, that is placed over the cathode ray tube, is not qualitative. One must still make a mechanical measurement of the height and width of the trace, and interpret what he measures.

Such equipment may cost considerably more than the laser itself. Taking into consideration the time and effort involved in operating the equipment and evaluating the results obtained, it is apparent that it is quite expensive to set up a laser for a given operation and check its performance.

It is an object of my invention to provide unique means for making a record of a laser beam pulse which avoids the use of equipment and the consumption of time heretofore required.

It is another object of my invention to provide a simple mechanical means for obtaining a permanent record suitable for use in setting up a laser for desired operation and for checking its performance.

A still further object of my invention is to provide a method of quickly checking laser performance with a minimum number of steps.

Yet another object of my invention is to provide apparatus for moving a multi-layer record element in the object plane of a laser to obtain markings corresponding to the distribution of beam energy in time and space.

It is also an object of my invention to provide a multi-layer record element and operable means therefor to record energy distribution of a laser beam, which comprises a minimum number of component parts of simple design and rugged construction, and which is inexpensive to produce and operate.

The above and other objects and advantages of my invention will become apparent from the following description taken in conjunction with the accompanying drawing, in which:

FIGURE 1 is a schematic diagram of a laser with charging and triggering means, a deflecting mirror in the path of the laser beam, and a focusing lens for focusing the deflected beam at an object plane, and showing, in accordance with my invention, the end view of a drum having an encircling multi-layer record strip thereon on which the beam impinges;

FIGURE 2 is a side elevation view of the drum with the strip thereon;

FIGURE 3 is an end view of spaced rollers carrying a record strip in accordance with my invention, wherein the portion of the strip struck by the beam is horizontal;

FIGURE 4 is an end view of a rotatable deflecting mirror disposed in the path of the laser beam, the beam being located between record strips carried on the confronting surfaces of arcuate members;

FIGURE 5 is a fragmentary top plan view of the record strip, showing the portions of different layers exposed by beams of different energy distributions;

FIGURE 6 is a fragmentary sectional view taken along the line 6—6 of FIGURE 5;

FIGURE 7 is a fragmentary sectional view taken along the line 7—7 of FIGURE 5;

FIGURE 8 is a fragmentary sectional view of another multi-layer record strip, to further aid in explaining the utility of my invention; and FIGURE 9 is a side elevation view of an embodiment of my invention in which a multi-layer disc is carried on a turntable.

Referring to FIGURE 1, there is depicted a laser 10 to which the charge from a capacitor bank 11 is to be applied upon application of voltage from a trigger source 12. The capacitor bank 11 is charged from a voltage source 13. When the trigger voltage is applied, the charge on the capacitor bank is applied to the laser pumping lamp stimulating the emission of a coherent radiation beam, all in a conventional manner. The beam extends at 14 to a deflecting mirror 15, from whence it passes at 16 through a focusing lens 17 onto an object plane 18, also in a conventional manner.

In accordance with my invention, a drum 20 is mounted below the object plane 18 on the shaft 21 of a motor 22, which preferably is a synchronous motor. A record strip 23 encircles the drum 20 and adheres to the outer surface thereof. The object plane is shown to be tangential to the outer surface of the strip, but it will be apparent that the arrangement could be such that the outer surface of the strip could be above or below the object plane, as where it is desired to test the beam energy immediately adjacent to and above or below the object plane.

The strip 23 is a multi-layer strip, the layers of which may be formed of a variety of materials, e.g., paper, plastic, coatings of paint. The strip is formed of a number of sheets stacked together. The sheet may be separate strips, which may or may not be bonded together, or they may comprise successive coatings of material applied in liquid form, each coating being allowed to dry before the next is applied. Preferably these layers are of different colors and have different absorptive characteristics, i.e., different refractory characteristics. Also, it is preferred that the most sensitive (i.e., least refractory) layer is the outer layer, and that these sensitivities decrease through the stack. Thus, the least sensitive layer is that immediately adjacent the drum 20.

FIGURES 5-7 illustrate a three-layer strip comprising an inner layer 25 of paper, and successive coatings 26, 27 of paint. The paper 25 is white, the middle layer 26 is red, and the outer layer 27 is black. The paper layer 25 may be provided with an adhesive, to permit the strip to be secured to the drum 20.

In accordance with my invention, movement of the strip 23, via rotation of the drum, results in a laser beam burning the layers to an extent depending on the energy of the beam at any given instant. Thus, and referring to FIGURE 5, laser beam pulses of different power levels at different times result in streaks 31, 32 formed in the strip, in which the length of different layers exposed to view represent the energy distributions of the beams in time and space.

Time is determined by the distance the strip 23 travels during the occurrence of a beam. In one embodiment, I use a drum of such size that, for a given motor speed, the outer layer 27 of the strip moves a distance of 1.0 centimeter in 1.0 millisecond.

Thus, viewing the streak 31, if the red portion 26 measures 1.0 cm. in length, and the white portion 25 measures 0.5 cm. in length, it is known that the beam duration for a selected low power level is approximately a millisecond, and that the beam duration for a selected higher power level occupies half that period.

Viewing the other streak, if the red portion 26 measures 2.0 cm., and the white portion 25 is 0.1 cm. long, it is apparent that the beam causing this streak was of the order of 2 milliseconds, and that the high power level duration thereof was concentrated in the first 1/20 of that period.

While I have described the beam as burning into or through the layers, I have discovered that the beam does not alter the colors of the layers. Thus, if it burns into the white layer 25, the appearance remains white. The same is true of the red layer 26.

In connection with the showing of streaks 31, 32 side by side, it will be apparent that the motor and drum assembly are located in different positions in relation to the laser beam to permit different laser beams to form these separate streaks.

Returning to the strip deformations caused by the beams, FIGURES 6 and 7 illustrate the extent to which the different layers are burned or boiled off. In FIGURE 5, the onset of the beam passed quickly through the outer black layer 27 and middle red layer 26, and on into the white paper 25. The power was sufficient to boil off a portion of the white layer for a substantial distance. It then decreased to a level such that it extended only into the red layer 26 for a similar distance, and finally decreased and extended partly into the outer black layer shortly before it terminated.

In FIGURE 7, it will be seen that only a very short length of the white layer 25 was burned, following which the beam penetrated only part way into the red layer 26 for a considerable distance. Again, as the beam neared termination, it penetrated only part way into the outer black layer 27.

It will be apparent that the foregoing is an extremely simple and effective method and means for determining the energy distribution of a laser pulse. The traces or streaks 31, 32 may be used for comparison in establishing or checking operation of the laser. For example, it may be desired to insure that the beam creates a trace like the streak 31. If the trace is much longer and shows more of the white layer 25 than in the trace 31, the voltage from the source 13 may be reduced and/or the number of capacitors in the capacitor bank 11 may be cut out until a trace is obtained which has the same appearance and dimensions as the streak 31.

My invention embraces the use of many layers for such a record strip. For example, FIGURE 8 shows the drum 20 on which is mounted a strip 23' formed of five layers 36–40. Again, the layers are preferably of different colors, e.g., black for the top layer, and yellow, blue, green and red for the remaining layers. If desired, the layer adjacent the drum may be reflective, e.g., aluminum, so as to prevent any possible damage to the drum from the beam.

The traces resulting from the use of such multi-layer strips are multi-colored. The greater the number of layers, the more nearly do the plan views of the traces represent the profile or pattern, in time, of the power levels of the laser pulse.

FIGURE 3 shows a different arrangement for effecting movement of the record strip. In this case, the strip 41 is formed as a loop carried on spaced rollers 42, 43, one of which is driven by the motor 22. By this means, the portion of the record moving past the focal line of the beam undergoes linear travel.

A still further embodiment of my invention is shown in FIGURE 4, which shows a mirror 45 rotatable by a motor 46 on an axis which is at right angles to the axis of the beam. The mirror 45 is located between spaced arcuate plates 47, 48 on the confronting surfaces of which are multi-layer record strips 49. As indicated, the plates 47, 48 are stationary.

As indicated at 50, the beam impinging on the mirror 45 is deflected and focused on the adjacent strip 49, thereby sweeping a trace on the strip. The trace thus made is different from that of the previously described arrangements, due to the fact that the revolving mirror 45 does not permit the beam to be focused at each point on the strip onto which it is deflected.

FIGURE 9 shows a multi-layer record disk 51 mounted on a plate or turntable 52 to be rotated at a predetermined speed by a motor 53. This arrangement provides traces which, though curved, have substantially the same contours as those for the embodiments illustrated in FIGURES 1–7. In such case, the length of the trace for a given pulse will differ in accordance with the distance from the center of the disc of the track on which the trace is formed. The linear travel of a point on a given track may be calibrated for comparison with a point on the track that moves, say, cm./ms. Alternatively, the speed of the motor may be decreased for tracks farther out, so as to provide the same linear travel per unit time of a point on any such track.

From the foregoing, it will be apparent that the various embodiments shown and described herein are illustrative of my invention, and that various modifications can be made therein without departing from the spirit and scope of my invention. Accordingly, I do not intend that my invention be limited, except as by the appended claims.

I claim:
1. The method of determining the energy of a laser beam employing a paper having a plurality of different colored layers of refractory material, which comprises the steps of:
   exposing the paper to the laser beam to be vaporized thereby to an extent dependent upon the instantaneous energy of said beam; and
   noting the color of refractory material exposed by the action of said beam on said paper to determine the instantaneous power in the beam.
2. Apparatus for developing a visual record of the energy distribution of a laser beam pulse comprising:
   a stack of a number of colored sheets of material, the color of each sheet being different from that of any immediately adjacent sheet;
   means to direct the beam against said stack to permit it to burn through the sheets a distance corresponding to the instantaneous pulse power;
   and means to effect relative movement between said stack and the beam at a predetermined speed, thereby to create a streak of different colors throughout the duration of the beam, the colors of the sheets in the streak indicating the distribution of the beam energy in time and space.
3. Apparatus as defined in claim 2, wherein the beam has an object plane, and wherein said means to effect relative movement includes a rotary member, said stack being mounted on said rotary member; and means to rotate said rotary member to effect movement of different portions of said stack in the object plane.
4. Apparatus as defined in claim 3, wherein said rotary member is a drum, said stack being formed as a strip encircling said drum, said drum being positioned with the object plane tangential to the outer sheet of said stack; and a motor for driving said drum at a predetermined speed.
5. Apparatus as defined in claim 3, wherein said rotary member is a turntable, the axis of said turntable being parallel to the beam, said stack being formed as a disc supported on the upper surface of said turntable, the upper sheet of said stack being in the object plane; and a motor to rotate said turntable at a predetermined speed.
6. Apparatus as defined in claim 3, wherein the stack is formed of a base sheet, and the remaining sheets are formed of successive coatings of material.

References Cited

UNITED STATES PATENTS

| | | | |
|---|---|---|---|
| 2,563,119 | 8/1951 | Kelly | 346—77 |
| 3,035,267 | 5/1962 | Vogtlin | 346—77 |
| 3,175,196 | 3/1965 | Lee et al. | 340—173 |
| 3,181,170 | 4/1965 | Akin | 346—76 X |
| 3,184,748 | 5/1965 | Muller et al. | 346—137 X |
| 3,256,524 | 6/1966 | Stauffer | 346—76 |
| 3,266,393 | 8/1966 | Chitayat | 95—1.1 |

RICHARD B. WILKINSON, *Primary Examiner.*
JOSEPH W. HARTARY, *Examiner.*